(12) United States Patent
Toneri et al.

(10) Patent No.: US 8,653,188 B2
(45) Date of Patent: Feb. 18, 2014

(54) THERMOPLASTIC RESIN COMPOSITION AND RESIN MOLDED PRODUCT

(75) Inventors: Tatsuya Toneri, Tokyo (JP); Masaaki Mawatari, Tokyo (JP)

(73) Assignee: Techno Polymer Co., Ltd., Tokyo (JP)

( * ) Notice: Subject to any disclaimer, the term of this patent is extended or adjusted under 35 U.S.C. 154(b) by 273 days.

(21) Appl. No.: 12/593,397

(22) PCT Filed: May 8, 2008

(86) PCT No.: PCT/JP2008/001154
§ 371 (c)(1),
(2), (4) Date: Feb. 17, 2010

(87) PCT Pub. No.: WO2008/139729
PCT Pub. Date: Nov. 20, 2008

(65) Prior Publication Data
US 2010/0152384 A1    Jun. 17, 2010

(30) Foreign Application Priority Data

May 15, 2007    (JP) .................... 2007-129006

(51) Int. Cl.
*C08L 51/06* (2006.01)
*C08L 67/00* (2006.01)
*C08L 67/04* (2006.01)

(52) U.S. Cl.
USPC .............. 525/64; 525/67; 525/437; 525/444; 525/445; 525/450

(58) Field of Classification Search
USPC ............... 525/437, 444, 445, 450, 64, 67
See application file for complete search history.

(56) References Cited

U.S. PATENT DOCUMENTS

| | | | |
|---|---|---|---|
| 5,252,642 A * | 10/1993 | Sinclair et al. | 524/108 |
| 6,235,825 B1 * | 5/2001 | Yoshida et al. | 524/314 |
| 2002/0065345 A1 * | 5/2002 | Narita et al. | 524/271 |
| 2002/0094444 A1 | 7/2002 | Nakata et al. | |
| 2005/0154114 A1 | 7/2005 | Hale | |
| 2005/0154148 A1 * | 7/2005 | Nakamichi et al. | 525/450 |
| 2005/0244606 A1 | 11/2005 | Egawa | |
| 2009/0171023 A1 | 7/2009 | Mawatari et al. | |
| 2010/0105836 A1 | 4/2010 | Mawatari et al. | |
| 2010/0160505 A1 | 6/2010 | Kumazawa et al. | |
| 2011/0269873 A1 * | 11/2011 | Seeliger et al. | 523/351 |
| 2011/0269907 A1 | 11/2011 | Kumazawa et al. | |
| 2012/0065332 A1 | 3/2012 | Mawatari et al. | |

FOREIGN PATENT DOCUMENTS

| | | |
|---|---|---|
| DE | 102005053069 A1 | 5/2007 |
| EP | 1 553 139 A1 | 7/2005 |
| JP | 2006-70210 | 3/2006 |
| JP | 2006-070210 | 3/2006 |
| JP | 2007063540 A | 3/2007 |
| JP | 2007-131690 | 5/2007 |
| WO | WO 2006/074815 * | 7/2006 |
| WO | WO 2007015448 A1 | 2/2007 |
| WO | WO 2008012946 A1 | 1/2008 |
| WO | WO 2008041356 A1 | 4/2008 |

OTHER PUBLICATIONS

International Search Report for PCT/JP2008/001154, mailed Jun. 10, 2008.
Search Report in EP 08 75 1678 dated Oct. 1, 2012.

* cited by examiner

*Primary Examiner* — Jeffrey Mullis
(74) *Attorney, Agent, or Firm* — Nixon & Vanderhye P.C.

(57) ABSTRACT

The object of the present invention is to provide a thermoplastic polymer composition which is excellent in the impact resistance, a fracture morphology and rigidity, as well as has a possibility of the effect for reducing environmental load.
The thermoplastic resin composition comprises 15 to 85% by mass of aliphatic polyester-based resin (A) comprising the following (AI) and (AII) components, and 15 to 85% by mass of styrene-based resin (B) which is at least one selected from the group consisting of the following (BI) to (BIII).

The above (AI) is an aliphatic polyester-based resin having units formed from an aliphatic diol and/or an alicyclic diol and an aliphatic dicarboxylic acid (including derivatives thereof) and/or an alicyclic dicarboxylic (including derivatives thereof) as repeating units, and the above (AII) is a polylactic acid-based aliphatic polyester resin having not less than 70 mol % of lactic acid unit content.
The above (BI) is a graft copolymer obtained by polymerizing vinyl-based monomers (b2) comprising an aromatic vinyl compound and another vinyl compound copolymerizable therewith in the presence of rubber polymer (b1), the above (BII) is a polymer of vinyl-based monomers (b2), and the above (BIII) is a mixture of said (BI) and (BII).

11 Claims, No Drawings

THERMOPLASTIC RESIN COMPOSITION AND RESIN MOLDED PRODUCT

This application is the U.S. national phase of International Application No. PCT/JP2008/001154 filed 8 May 2008, which designated the U.S. and claims priority to JP Application No. 2007-129006 filed 15 May 2007, the entire contents of each of which are hereby incorporated by reference.

TECHNICAL FIELD

The present invention relates to a thermoplastic resin composition and a resin molded product. More particularly the present invention relates to a thermoplastic resin composition comprising an aliphatic polyester and a resin molded product produced by molding the thermoplastic resin composition.

BACKGROUND ART

Recently, it is pointed out that to produce and consume large amount of plastics derived from fossil resources is source of environmental pollution in view of global heating and waste disposal. From this background, a demand for using biodegradable polymers and polymers derived from vegetable-origin materials is enhanced, and study and research therefor are conducted actively. Among these, aliphatic polyesters are noticed as the biodegradable materials and are expected for development to various arts because of expecting an effect for reducing environmental load by producing aliphatic polyesters derived from vegetable-origin materials. However, the aliphatic polyesters have such problems that the hydrolysis activity is high, the properties thereof are difficult to maintain under high temperature and high humidity and also generally the impact resistance is poor. Therefore, a aliphatic polyester is limited in the field-of-use when singly used.

As the method for improving the impact resistance of aliphatic polyester, there is proposed a composition comprising an aliphatic polyester and various styrene-based resin containing ABS resin (refer to Patent Documents 1 to 3). However, by the present inventors' studies there to, it has been found that there is no effect for improving the impact resistance in all resin compositions and it is difficult to obtain a resin composition having. Further, as a proposal for improving both impact resistance and rigidity, there is proposed a composition comprising polylactic acid resin and a specific rubber reinforced resin (refer to Patent Document 4). However, this composition has such problems that the elongation at break is poor and brittle fracture generates in the impact resistance test.

Patent Document 1: Japanese Patent Application Laid-Open (KOKAI) No. 2005-171205
Patent Document 2: Japanese Patent Application Laid-Open (KOKAI) No. 2006-45485
Patent Document 3: Japanese Patent Application Laid-Open (KOKAI) No. 2006-45486
Patent Document 4: Japanese Patent Application Laid-Open (KOKAI) No. 2006-137908

DISCLOSURE OF THE INVENTION

Problem to be Solved by the Invention

The present invention has been made from the above problem. An object of the present invention is to provide a thermoplastic polymer composition which comprises a vegetable-origin material and a biodegradable polymer, is excellent in the impact resistance, has a fracture morphology of ductile breaking type and is excellent in rigidity, and also provide a resin molded product comprising the above thermoplastic polymer composition.

Means for Solving the Problem

That is, in a first aspect of the present invention, there is provided a thermoplastic resin composition comprising:
15 to 85% by mass of aliphatic polyester-based resin (A) comprising the following (AI) and (AII) components, and
15 to 85% by mass of styrene-based resin (B) which is at least one selected from the group consisting of the following (BI) to (BIII), where the total amount of components (A) and (B) is 100% by mass, The above (AI) is an aliphatic polyester-based resin having units formed from an aliphatic diol and/or an alicyclic diol and an aliphatic dicarboxylic acid (including derivatives thereof) and/or an alicyclic dicarboxylic (including derivatives thereof) as repeating units. The above (AII) is a polylactic acid-based aliphatic polyester resin having not less than 70 mol % of content of lactic acid unit.

The above (BI) is a graft copolymer obtained by polymerizing vinyl-based monomers (b2) comprising an aromatic vinyl compound and another vinyl compound copolymerizable therewith in the presence of rubber polymer (b1). The above (BII) being a polymer of vinyl-based monomers (b2). The above (BII) is a mixture of said (BI) and (BII).

In a second aspect of the present invention, there is provided a resin molded product produced by molding the above thermoplastic resin composition.

Effect of the Invention

According to the present invention, there is provided a thermoplastic polymer composition which comprises a vegetable-origin material and a biodegradable polymer, is excellent in the impact resistance, has a fracture morphology of ductile breaking type and is excellent in rigidity, and also provide a resin molded product comprising the above thermoplastic polymer composition.

PREFERRED EMBODIMENTS FOR CARRYING OUT THE INVENTION

The present invention is described in detail below. In the present invention, "(co)polymer" means a single polymer and copolymer, "(meth)acryl" means acryl and/or methacryl, and "(meth)acrylate" means acrylate and/or methacrylate.

In the present invention, as the essential components, an aliphatic polyester-based resin (A) and a styrene-base resin (B) are used.

<Aliphatic Polyester-Based Resin (AI)>

The aliphatic polyester-based resin (AI) used in the present invention has a unit derived from an aliphatic diol and/or alicyclic diol and a unit derived from an aliphatic dicarboxyl acid (including derivatives thereof) and/or alicyclic dicarboxyl acid (including derivatives thereof) as repeating units.

The above dials are represented by the following general formula (1).

$$HO-R^1-OH \qquad (1)$$

In the above general formula (1), $R^1$ represents a divalent aliphatic hydrocarbon group. The carbon number of $R^1$ is usually 2 to 11, preferably 2 to 6. $R^1$ may include cycloalkylene group and may have a branch chain. $R^1$ is preferably "—$(CH_2)_n$—" where n is an integer of 2 to 11, preferably an integer of 2 to 6.

As concrete examples of the above diol, there are exemplified ethylene glycol, trimethylene glycol, 1,3-propanediol, 1,4-butanediol, 1,5-pentanediol, 1,6-hexanediol, or the like. Of these, 1,4-butanediol is preferred in view of the properties of obtained aliphatic polyester. Two or more the above dials may be used in combination The above dicarboxyl acids are represented by the following general formula (2).

HOOC—$R^1$—COOH (2)

In the above general formula (2), $R^2$ represents a directly bond group or divalent aliphatic hydrocarbon group. The carbon number of $R^2$ is usually 2 to 11, preferably 2 to 6. $R^2$ may include cycloalkylene group and may have a branch chain. $R^2$ is preferably "—$(CH_2)_m$—" where m is 0 or an integer of 1 to 11, preferably 0 or an integer of 1 to 6.

As concrete examples of the above dicarboxyl acid, there are exemplified oxalic acid, succinic acid, glutaric acid, adipic acid, sebacic acid, suberic acid, dodecanedioic acid or the like, and as the derivatives thereof, there are exemplified lower alkyl esters and acid anhydrides thereof. As the derivatives, compounds where both two carboxyl groups are converted to ester groups or the like are preferred. Of these, succinic acid and adipic acid are preferred, succinic acid is especially preferred in view of the properties of obtained aliphatic polyester. Two or more the above dicarboxyl acids may be used in combination The aliphatic polyester-based resin (AI) may be copolymerised with a bifunctional aliphatic oxycarboxyl acid and a trifunctional aliphatic oxycarboxyl acid.

As the bifunctional aliphatic oxycarboxyl acid, there is no limit as long as having one hydroxyl group and one carboxyl group in the molecule, and an aliphatic oxycarboxyl acid represented by the following general formula (3) are preferred.

HO—$R^3$—OH (3)

In the above general formula (3), $R^3$ represents a divalent aliphatic hydrocarbon group. The carbon number of $R^3$ is usually 1 to 11, preferably 1 to 16. $R^3$ may include cycloalkylene group and may have a branch chain.

The bifunctional aliphatic oxycarboxyl acid is preferably a compound having a hydroxyl group and carboxyl group in one carbon atom. Especially, it is preferable to use a compound represented by the following general formula (4) so that the polymerization rate increases.

$$\text{HO—CH—COOH} \atop {|\atop C_zH_{2z+1}}} \quad (4)$$

In the general formula (4), z represents 0 or an integer of 1 or more, preferably 0 or an integer of 1 to 10, more preferably 0 or an integer of 1 to 5.

As concrete examples of bifunctional aliphatic oxycarboxyl acid, there are exemplified lactic acid, glycolic acid, 3-hydroxybutyric acid, 4-hydroxybutyric acid, 2-hydroxy-n-butyric acid, 2-hydroxy-3,3-methyl butyric acid, 2-methyl lactic acid, 2-hydroxycaproic acid, mixture thereof, or the like. If any optical isomers are present in the above compounds, any isomers such as D form, L form, and racemic form may be used. As the state thereof, any states such as solid, liquid, and aqueous solution thereof may be used. Especially, lactic acid, glycolic acid and aqueous solution thereof are preferred because the increase of polymerization rate at use thereof is remarkable and it is easily available. As lactic acid and glycolic acid, 50%, 70% and 90% aqueous solutions thereof are offered commercially and easily available.

As the trifunctional aliphatic oxycarboxyl acid, there may be mentioned a compound having both hydroxyl group(s) and carboxyl group(s) which are totally three groups, that is, (a) a compound having two carboxyl groups and one hydroxyl group in the molecule and (b) a compound having one carboxyl group and two hydroxyl groups in the molecule. Of these, the above (a) is preferred in view of easily availability in the market and lower cost. Further, a compound having relatively lower molecular weight is preferred and concretely, malic acid is preferred.

The aliphatic polyester-based resin (AI) can be obtained by using the above components and reacting thereof under polyester producing condition. As the polyester producing condition, there are mentioned conditions of generating (a) simple formation of ester bond by dehydration, (b) dealcoholization as the other condensation (namely, transesterification) and (c) addition when using an acid anhydride. In order to accelerate the dehydration or dealcoholization, an azeotropic agent may be used, reduced pressure condition may be used and also, a catalyst may be used.

The amount of use of diol component is substantially equal molar of dicarboxyl acid (including derivative thereof). However, in the practical production process, the diol component is used in excess amount of usually 1 to 20 mol % to the amount of dicarboxyl acid because the diol component is distilled in the esterification reaction. The amount of use of bifunctional aliphatic oxycarboxyl acid is usually not more than 60 mol, preferably 0.04 to 20 mol, more preferably 3 to 10 mol based on 100 mol of dicarboxyl acid. By using it within this amount, an aliphatic polyester-based resin (A) having more high molecular weight can be obtained. The amount of use of bifunctional aliphatic oxycarboxyl acid is usually not more than 5 mol, preferably not more than 1 mol based on 100 mol of dicarboxyl acid. When using it in an amount of more than 5 mol based on 100 mol of dicarboxyl acid, a risk of gelation is increased.

The addition timing of bifunctional aliphatic oxycarboxyl acid is not limited as long as before formation reaction of polyester and the following methods are preferred: (a) a method comprising adding the bifunctional aliphatic oxycarboxyl acid at the stage of feeding the materials or during the esterification reaction stage with such a condition that the catalyst is dissolved in the bifunctional aliphatic oxycarboxyl acid solution; or (b) a method comprising adding the bifunctional aliphatic oxycarboxyl acid and the catalyst simultaneously at the stage of feeding the materials.

As the catalyst used for the esterification, there are exemplified metal compounds of germanium, titanium, antimony, tin, magnesium, calcium, zinc or the like which is soluble into the reaction system. Of these, germanium compounds are preferred and concrete examples thereof may include organic germanium compounds such as tetraalkoxy germanium and inorganic germanium compounds such as germanium oxide and germanium chloride. In view of cost and easy availability, germanium oxide, tetraethoxy germanium and tetrabutoxy germanium are especially preferred.

The amount of catalyst used is usually 0.001 to 3% by mass, preferably 0.005 to 1.5% by mass based on the total amount of used monomers.

The addition timing of catalyst is not limited as long as before formation reaction of polyester and it may be added at the stage of feeding the materials and at the stage of start of the reducing pressure. A method of adding the catalyst and bifunctional aliphatic oxycarboxyl acid simultaneously at the stage of feeding the materials, or a method of adding the catalyst in which the catalyst is dissolved into the aqueous bifunctional aliphatic oxycarboxyl acid solution and the solution is added, are especially preferred.

The esterification conditions such as reaction temperature, time and pressure are not specified as long as the aimed aliphatic polyester can be produced. The reaction temperature is usually 150 to 2608, preferably 180 to 230° C. The reaction time is usually not less than 1 hour, preferably 2 to 15 hours. The reaction pressure is usually not more than 10 mmHg, preferably not more than 2 mmHg.

The number average molecular weight (Mn) of aliphatic polyester-based resin (AI) is usually 10000 to 200000, preferably 30000 to 200000 in view of attaining aimed impact resistance. The ratio of weight average molecular weight (Mn) to the number average molecular weight (Mn) (Mw/Mn) is usually not less than 3, preferably not less than 4.

In the present invention, in view of reducing environmental load which is one of the technical subject in the resent invention, it is preferable that at least one of the diol component and dicarboxyl component constituting the aliphatic polyester-based resin (AI) is derived from a vegetable-origin material, more preferably both components are derived from vegetable-origin materials.

Into the aliphatic polyester-based resin (AI), the other copolymerizable component can be introduced as long as it does not affect adversely to the technical effect of the present invention. As the other copolymerizable component, there are exemplified aromatic oxycarboxyl acids such as hydroxybenzoic acid, aromatic diols such as bisphenol A, aromatic dicarboxyl acids such as terephthalic acid, and isophthalic acid, tri- or more functional aliphatic polyols, aliphatic polycarboxyl acids, aromatic polycarboxyl acids, tetra- or more functional oxycarboxyl acids, or the like. The amount of these used is usually not more than 50 mol %, preferably not more than 20 mol % based on the total amount of monomers used.

<Aliphatic Polyester-Based Resin (AII)>

The aliphatic polyester-based resin (AII) used in the present invention is a polylactic acid-based aliphatic polyester resin having not less than 70 mol % of lactic acid unit content. In view of having sufficient mechanical strength, the number average molecular weight of polylactic acid-based aliphatic polyester resin is usually not less than 30000, preferably not less than 100000 and the upper limit thereof is usually 900000. The molar ratio of L form to D form (L/D) is not limited and all ratios of 100/0 to 0/100 can be employed. When it is preferable that the elastic modulus is high, the L form percentage is preferably not less than 95%. The content of lactic acid unit in the polylactic acid-based aliphatic polyester resin is preferably not less than 80 mol %, more preferably not less than 90 mol %, especially preferably not less than 95 mol %. The production method of polylactic acid is not specified, for example, there are mentioned ring-opening polymerization method through lactide and direct polycondensation method of lactic acid.

Incidentally, as the other monomer unit than lactic acid, there may be used any one aliphatic diol unit, aliphatic dicarboxyl acid unit and aliphatic oxycarboxyl acid mentioned in the above aliphatic polyester-based resin (AI) optionally.

<Styrene-Based Resin (B)>

The styrene-based resin (B) used in the present invention is at least one selected from the group consisting of the following (BI) to (BIII). Namely, the above styrene-based resin (BI) is a graft copolymer obtained by polymerizing vinyl-based monomers (b2) comprising an aromatic vinyl compound and another vinyl compound copolymerizable therewith in the presence of rubber polymer (b1). The above styrene-based resin (BII) is a polymer of vinyl-based monomers (b2). The above styrene-based resin (BIII) is a mixture of said (BI) and (BII).

<Styrene-Based Resin (BI)>

As the rubber polymer (b1), there is no limitation and there are exemplified polybutadiene, butadiene/styrene copolymer, butadiene/acrylonitrile copolymer, ethylene/propylene copolymer, ethylene/propylene/non-conjugation diene copolymer, ethylene/butene-1/conjugation diene copolymer, acrylic rubber, silicone rubber, silicone/acryl-based IPN rubber, natural rubber, styrene/butadiene-based block copolymer, styrene/isoprene-based block copolymer, hydrogenated product of styrene/butadiene-based block copolymer. Two or more of these may be used in combination. Of these, polybutadiene, butadiene/styrene copolymer, ethylene/propylene copolymer, ethylene/propylene/non-conjugation diene copolymer, acrylic rubber, silicone rubber and natural rubber are preferred.

The gel containing percentage of rubber polymer (b1) is not specified and usually not more than 98% by mass, preferably 40 to 98% by mass in case of producing the rubber polymer (b1) by emulsion polymerization. Within this gel containing percentage range, a thermoplastic resin composition capable of providing a molded product especially excellent in impact resistance can be obtained. The gel containing percentage may be controlled by properly adjusting the kind and amount of molecular weight controller, polymerization time, polymerization temperature, polymerization conversion, or the like at the production stage of rubber polymer (b1). The above gel containing percentage can be determined by the following method.

Namely, 1 g of rubber polymer is put into 100 ml of toluene and is statically left for 48 hour at room temperature. Thereafter, the rubber polymer/toluene mixture is filtered by a 100 mesh wire-mesh whose mass is W1 g. The remained toluene insoluble matter and wire mesh are dried in vacuum at 80° C. for 6 hours, and the weight of dried these is measured (these total mass: W2 g). Then, the gel containing percentage is calculated by the following formula (I).

$$\text{Gel containing percentage (\% by mass)}=[\{W2\ (g)-W1\ (g)\}/1\ (g)]\times 100 \quad (I)$$

As the aromatic vinyl compound, there are exemplified styrene, α-methylstyrene, hydroxystyrene, or the like. Two or more of these are used in combination. Of these, styrene and α-methylstyrene are preferred.

The content of rubber polymer (b1) in the styrene-based resin (BI) is usually 20 to 80% by mass, preferably 30 to 75% by mass, more preferably 35 to 70% by mass based on 100% by mass of styrene-based resin (BI).

As the other vinyl monomer copolymerizable to the aromatic vinyl compound, there are exemplified vinyl cyanide compounds, (meth)acrylic ester compounds, maleimide compounds, other unsaturated compounds containing various functional groups, or the like.

As a preferable embodiment in the present invention, the aromatic vinyl compound is essential monomer component and at least one two or more selected from the group consisting of vinyl cyanide compound, (meth)acrylic ester compound and maleimide compound is used in combination, if required. Further, if required, at least one of other unsaturated compounds containing various functional groups may be used in combination. As the other unsaturated compound containing various functional groups, there are exemplified unsaturated acid compounds, epoxy-containing unsaturated compounds, hydroxyl group-containing unsaturated compounds, oxazoline group-containing unsaturated compounds, acid anhydride group-containing unsaturated compounds, substituted or unsubstituted amino group-containing unsaturated compounds, or the like. Two or more of these may be used in combination.

As the vinyl cyanide compounds, there are exemplified acrylonitrile, methacrylonitrile, or the like. Two or more of these may be used in combination. When using the vinyl cyanide compound, the chemical resistance is provided thereto. The amount of vinyl cyanide compound used is usually 1 to 60% by mass, preferably 5 to 50% by mass based on the total amount of monomer components.

As the (meth)acrylic ester compounds, there are exemplified methyl acrylate, ethyl acrylate, butyl acrylate, methyl methacrylate, ethyl methacrylate, butyl methacrylate, or the like. Two or more of these may be used in combination. When using the (meth)acrylic ester compound, the surface hardness is improved and also the compatibility of the aliphatic polyester-based resin (A) and the styrene-based resin (B) may be improved. The amount of (meth)acrylic ester compound used is usually 1 to 80% by mass, preferably 5 to 80% by mass based on the total amount of monomer components.

As the maleimide compounds, there are exemplified, maleimide, N-phenyl maleimide, N-cyclohexyl maleimide or the like. Two or more of these may be used in combination. Further, in order to introduce the maleimide unit, a method comprising copolymerizing maleic anhydride and thereafter conducting the imidization thereof may be used. When using the maleimide compound, the heat resistance is provided thereto. The amount of maleimide compound used is usually 1 to 60% by mass, preferably 5 to 50% by mass based on the total amount of monomer components.

As the unsaturated acid compounds, there are exemplified, acrylic acid, methacrylic acid, ethacrylic acid, maleic acid, fumaric acid, itaconic acid, crotonic acid, cinnamic acid or the like. Two or more of these may be used in combination. As the epoxy-containing unsaturated compounds, there are exemplified, glycidyl acrylate, glycidyl methacrylate, allylglycidyl ether or the like. Two or more of these may be used in combination.

As the hydroxyl group-containing unsaturated compounds, there are exemplified, 3-hydroxy-1-propene, 4-hydroxy-1-butene, cis-4-hydroxy-2-butene, trans-4-hydroxy-2-butene, 3-hydroxy-2-methyl-1-propene, 2-hydroxyethyl methacrylate, N-(4-hydroxyphenyl)maleimide or the like. Two or more of these may be used in combination.

As the oxazoline group-containing unsaturated compounds, there are exemplified, vinyl oxazolin or the like. Two or more of these may be used in combination. As the acid anhydride group-containing unsaturated compounds, there are exemplified, maleic anhydride, itaconic anhydride, citraconic anhydride or the like. Two or more of these may be used in combination.

As the substituted or unsubstituted amino group-containing unsaturated compounds, there are exemplified, aminoethyl acrylate, propylaminoethyl acrylate, dimethylaminoethyl methacrylate, phenylaminoethyl methacrylate, N-vinyldiethylamine, N-acetylvinylamine, acrylamine, methacrylamine, N-methylacrylamine, acrylamide, N-methylacrylamide, p-aminostyrene or the like. Two or more of these may be used in combination.

When using the other unsaturated compound containing various functional groups, the compatibility between the aliphatic polyester-based resin (A) and styrene-based resin (B) may be enhanced when blended each other. Especially, the monomer used for attaining this effect of compatibility is preferably epoxy-containing unsaturated compounds, unsaturated acid compounds and hydroxyl group-containing unsaturated compounds. The amount of other unsaturated compound containing various functional groups used as the total amount of other unsaturated compound containing various functional groups used in the styrene-based resin (BI) is usually 0.1 to 25% by mass, preferably 0.1 to 15% by mass based on the amount of the styrene-based resin (BI) and is usually 0.1 to 20% by mass, preferably 0.1 to 10% by mass based on the amount of the styrene-based resin (BIII).

The amount of monomer used other than the aromatic vinyl compound in the whole vinyl monomer is usually not more than 80% by mass, preferably not more than 60% by mass, more preferably not more than 40% by mass based on the amount of whole vinyl monomer (as 100% by mass).

As the preferred combination of vinyl monomers, there are exemplified styrene/acrylonitrile, styrene/methyl methacrylate, styrene/acrylonitrile/methyl methacrylate, styrene/acrylonitrile/glycidyl methacrylate, styrene/acrylonitrile/2-hydroxyethyl methacrylate, styrene/acrylonitrile/(meth)acrylic acid, styrene/N-phenyl maleimide, styrene/methyl methacrylate/cyclohexyl maleimide, or the like. The especially preferred combination is styrene/acrylonitrile=65/45 to 90/10 (mass ratio), styrene/methyl methacrylate=80/20 to 20/80 (mass ratio), styrene/acrylonitrile/methyl methacrylate=20 to 80% by mass of styrene and 20 to 80% by mass of total amount of acrylonitrile and methyl methacrylate.

The styrene-based resin (BI) may be produced by known polymerization methods such as emulsion polymerization, bulk polymerization, solution polymerization, suspension polymerization and combination thereof. Of these, the preferred (co)polymerization method for polymerizing the vinyl-based monomer in the presence of rubber polymer (b1) is emulsion polymerization and solution polymerization.

When the styrene-based resin (BI) is produced by the emulsion polymerization, a known polymerization initiator, chain transfer agent, emulsifier or the like may be used.

As the polymerization initiators, there are exemplified cumene hydroperoxide, p-menthane hydroxide, di-isopropylbenzene hydroperoxide, tetra-methylbutyl hydroperoxide, tert-butyl hydroperoxide, potassium peroxodisulfate, azobisisobutyronitrile or the like. It is preferred to use various reductants, redox systems such as saccharated iron pyrophosphate containing formulation and sulfoxylate formulation as a polymerization initiator assistants.

As the chain transfer agents, there are exemplified octylmercaptan, n-dodecylmercaptan, t-dodecylmercaptan, n-hexylmercaptan, ter-pinolenes or the like. As the emulsifiers, there are exemplified alkyl benzene sulfonate such as dodecyl benzene sulfonate, aliphatic sulfonates such as sodium lauryl sulfate, higher fatty acid salts such as potassium laurate, potassium stearate, potassium oleate potassium palmitate, resinates such as potassium rosinate or the like.

In the emulsion polymerization, as the using method of the rubber polymer and vinyl-based monomers, the whole vinyl-based monomers may be added and polymerized in the presence of whole amount of rubber polymer as well as may be added separately or continuously and polymerized. Further, a part of rubber polymer may be added in the course of polymerization.

After the emulsion polymerization, the obtained latex is usually coagulated by use of a coagulant, washed with water and dried to obtain styrene-based resin (BI) powders. In this, two or more styrene-based resin (BI) latexes obtained by the emulsion polymerization may be properly blended and thereafter be coagulated. As the coagulant, there may be used inorganic salts such as calcium chloride, magnesium sulfate and magnesium chloride, acids such as sulfuric acid, hydrochloric acid, acetic acid, citric acid and malic acid, or the like. In case where using the acid as the coagulant, it is preferred to neutralize it with aqueous alkaline solution after the coagulation. By this neutralization, the impact resistance and hydrolysis resistance of thermoplastic resin composition according to the present invention may be improved. As the alkaline compound used in the neutralization, sodium hydroxide and potassium hydroxide are preferred.

As the solvent used in the production of styrene-based resin (BI) by the solution polymerization, there may be used inert polymerization solvent used in usually radical polymerization and may be exemplified aromatic hydrocarbons such as ethylbenzene and toluene, ketones such as methylethyl ketone and acetone, acetonitrile, dimethylformamide, N-methylpyrrolidone, or the like.

The polymerization temperature is usually 80 to 140° C., preferably 85 to 120° C. In the polymerization, the polymerization initiator may be used as well as the polymerization may be conducted by heat polymerization without using the polymerization initiator. As the polymerization initiator, there may be preferably used organic peroxides such as ketoneperoxides, dialkylperoxides, diacylperoxides, peroxyesters, hydroperoxides, azobisisobutyronitrile and benzoylperoxide. When using the chain transfer agent, there may be used mercaptans, ter-pinolenes, and α-methylstyrene dimer. When the styrene-based resin (BI) is produced by the bulk polymerization or suspension polymerization, the polymerization initiators and chain transfer agents as explained in the above solution polymerization may be used. The amount of remained monomer in the styrene-based resin (BI) produced by the above explained respective method is usually not more than 10000 ppm, preferably not more than 5000 ppm.

Further, the styrene-based resin (BI) obtained by polymerizing the vinyl-based monomers in the presence of rubber polymer usually comprising a copolymer in which the vinyl-based monomers are graft-polymerized to the rubber polymer and non-grafted component in which they are not graft-polymerized to the rubber polymer. The graft percentage of styrene-based resin (BI) is usually 20 to 200%, preferably 30 to 15%, more preferably 40 to 120%. The graft percentage is determined by the following formula (II).

$$\text{Graft percentage (\% by mass)} = \{(T-S)/S\} \times 100 \quad \text{(II)}$$

In the formula (II), T represents a mass (g) of the insoluble component which is obtained by a method comprising putting 1 g of styrene-based resin (BI) into 20 ml of acetone, shaking it for 2 hours by use of a shaking apparatus, centrifuging for 60 minutes (rotating speed=23000 rpm) by use of a centrifuge separation equipment to separate it into soluble component and insoluble component. S represents a mass (g) of rubber polymer contained in 1 g of styrene-based resin (BI).

The intrinsic viscosity [η] of an acetone-soluble component contained in the styrene-based resin (BI) measured in a methylethyl ketone solution at 30° C. is usually 0.2 to 1.2 dl/g, preferably 0.2 to 1.0 dl/g, more preferably 0.3 to 0.8 dl/g. Further, the average particle size grafted rubber polymer particles dispersed in the styrene-based resin (BI) is usually 20 to 3000 nm, preferably 100 to 2000 nm, more preferably 150 to 800 nm. The average particle size can be measured by known methods using an electron microscope.

<Styrene-Based Resin (BII)>

The styrene-based resin (BII) is a polymer of vinyl-based monomers (b2). Namely, it is a polymer obtained by (co)polymerizing the vinyl-based monomer (b2) in the absence of rubber polymer (b1) different from the production of styrene-based resin (BI). Therefore, the explanation for except for the styrene-based resin (BII) is equal to the above explanation for the styrene-based resin (BI) except for using no rubber polymer (b1), and also the same kind and used amount of unsaturated compound containing various functional groups described above can be used. However, the preferred methods for (co)polymerizing vinyl-based monomer in the absence of rubber polymer (b1) are bulk polymerization, solution polymerization, suspension polymerization and emulsion polymerization. As the bulk polymerization and solution polymerization, known methods may be employed. As the suspension polymerization and emulsion polymerization, the above explanation in the styrene-based resin (BI) may be employed.

<Styrene-Based Resin (BIII)>

The styrene-based resin (BII) is a mixture of the above styrene-based resin (BI) and styrene-based resin (BII). The blending ratio (mass ratio) of styrene-based resin (BI) and styrene-based resin (BII) is usually 1:0.1 to 1:10, preferably 1:0.1 to 1:5, more preferably 1:0.1 to 1:2.

The content of rubber polymer (b1) in the styrene-based resin (BIII) is usually 5 to 50% by mass, preferably 5 to 40% by mass, more preferably 7 to 30% by mass based on the amount of styrene-based resin (BIII) (as 100% by mass).

The amount of at least one of other unsaturated compounds containing various functional groups selected from the group consisting of unsaturated acid compounds, epoxy-containing unsaturated compounds, hydroxyl group-containing unsaturated compounds, oxazoline group-containing unsaturated compounds, acid anhydride group-containing unsaturated compounds, substituted or unsubstituted amino group-containing unsaturated compounds is usually 0.1 to 20% by mass, preferably 0.1 to 10% by mass based on the amount of styrene-based resin (BIII).

<Thermoplastic Resin Composition>

The thermoplastic resin composition according to the present invention comprises 15 to 85% by mass of aliphatic polyester-based resin (A) (total amount of (AI) and (AII) components) and 15 to 85% by mass of styrene-based resin (B) (the total amount of components (A) and (B) is 100% by mass). The thermoplastic resin composition comprises preferably 25 to 80% by mass of component (A) and 20 to 75% by mass of component (B), more preferably 30 to 70% by mass of component (A) and 30 to 70% by mass of component (B), especially preferably 40 to 60% by mass of component (A) and 40 to 60% by mass of component (B). When the content of styrene-based resin (B) is less than 15% by mass, the balance between the impact resistance and rigidity is poor, and the fracture morphology is not ductile breaking type. When the content of styrene-based resin (B) is more than 85% by mass, the rigidity is poor, and balance between the impact resistance and rigidity is poor. The content of rubber polymer (b1) in the thermoplastic resin composition is usually 1 to 40% by mass, preferably 4 to 25% by mass, more preferably 10 to 18% by mass.

<Ratio of Components (AI) and (AII) in the Aliphatic Polyester-Based Resin>

The content of content (AI) in 100 parts by mass of total amount of aliphatic polyesters (AI) and (AII) is usually 2 to 98 parts by mass. In case where the rigidity is improved while maintaining the impact resistance, the content of content (AI) is preferably 2 to 80 parts by mass, more preferably 2 to 50 parts by mass, especially preferably 2 to 30 parts by mass. When the content of content (AI) is less than the above range, the impact resistance may be poor. When the content of content (AI) is more than the above range, the rigidity may be poor.

The thermoplastic resin composition according to the present invention may further comprise at least one thermoplastic resin (C) selected from the group consisting of aromatic polycarbonate resin, aromatic polyester resin, polyamide resin, acryl-based resin, modified polyolefin-based resin, polyphenylene ether-based resin, polyacetal resin. Further, the above thermoplastic resin (C) modified with a compatibilizing agent or a functional group may be blended thereinto. Especially, by blending the aromatic polycarbonate resin, the heat resistance may be improved. The content of thermoplastic resin (C) is usually 2 to 100 parts by mass, preferably 5 to 150 parts by mass based on 100 parts by mass of total amount of aliphatic polyester-based resin (A) and styrene-based resin (B).

<Other Components>

In the thermoplastic resin composition according to the present invention, depending object and use, various additives and other resins than the above aliphatic polyester-based resin (A), styrene-based resin (B) and optionally blended thermoplastic resin (C) may be further blended. In this case, as the various additives, there are exemplified one or two or more of antioxidants, UV absorbers, lubricants, plasticizers, stabilizers, releasing agents, antistatic agents, foaming agents, antibacterial agents, mildew-proofing agents, resisting agents, coloring agents (pigments, dyes or the like), fluorescent brighteners, fluorescent dyes, fillers such as carbon fibers, glass fibers, talc, wollastonite, calcium carbonate and silica, flame retardants such as halogen-based flame retardants, phosphorus-based flame retardants and antimony compounds, d anti-dripping agents, silicone oil, coupling agents, or the like. As the other resins, there are exemplified vinyl chloride-based resins, olefin-based resins or the like. Two or more of these may be used in combination.

The method for blending the above additive and other resin into the thermoplastic resin composition according to the present invention is not specified and there are exemplified a method comprising adding them at the mixing stage of aliphatic polyester-based resin (A) and styrene-based resin (B), a method comprising further melt-blending them into the resin composition after the mixing of both resins, a method comprising adding them at the polymerization stage(s) of the one or both resin(s), a method comprising adding them into the one or both resin(s) before mixing thereof, or the like.

The thermoplastic resin composition according to the present invention is produced by melt-kneading the above respective components by use of various extruders, Banbury mixer, kneader, continuous kneader, rolls or the like. In the kneading thereof, whole respective components may be added at once or added separately.

The thermoplastic resin composition according to the present invention is molded to form a resin molded product by known molding methods such as injection molding, press molding, calender molding, T-die extrusion molding, inflation molding, lamination molding, vacuum molding, profile extrusion molding or the like. As the molding products, there are exemplified injection molding products, sheet molding products (including multi-layered sheets), film molding products (including multi-layered films), profile extrusion molding products, vacuum molding products, or the like.

The resin molding products obtained by the above are excellent in the impact resistance, rigidity, hydrolysis resistance, chemical resistance and are preferably useful in the fields of household appliances, building materials, sanitary materials or the like as various parts, housings or the like.

EXAMPLES

The present invention is described in more detail by the following examples, but these examples are only illustrative and not intended to limit a scope of the present invention. Meanwhile, in the following examples, etc., the "part(s)" and "%" represent "part(s) by mass" and "% by mass", respectively, unless otherwise specified.

<Evaluation Methods>

(1) Gel Content of Rubber Polymer:
 Measured by the above-described method.
(2) Average Particle Diameter of Rubber Polymer Latex:
 The average particle diameter of the rubber polymer latex used for producing the styrene-based resin (B) was measured by a light scattering method. The measurement was performed using a measuring apparatus "LPA-3100 Model" manufactured by Otsuka Denshi Co., Ltd., by a cumulant method at a cumulative frequency of 70 times. Meanwhile, it was confirmed by using an electron microscope that the diameter of particles of the grafted rubber polymer dispersed in the styrene-based resin (B) was approximately the same as the particle diameter of the latex.
(3) Graft Percentage of Styrene-Based (B) Resin:
 Measured by the above-described method.
(4) Intrinsic Viscosity [η] of Acetone-Soluble Component of Styrene-Based Resin (B):
 Measured by the above-described method.
(5) Impact Resistance:
 The puncture impact test was conducted by use of a high speed puncture impact tester ("Hydroshot HITS-P10" manufactured by Shimadzu Corporation). The test piece was prepared by molding the resin composition by use of the following injection molding machine to form a 55 mm (longitudinal)×80 mm (width)×2 mm (thickness) test piece. As the test condition, the striker diameter was 15.9 mm and the weight-drop speed was 2.4 (m/s). The fracture morphology was evaluated by visual evaluation as the following two criterions: ○: showing ductile breaking without flying fragments, X: flying fragments or crack generation in the test piece.
(6) Rigidity:
 The bending modulus was measured according to ISO178 by use of Instron universal tester ("Model4204" manufactured by INSTRON Co., LTD).

<Thermoplastic Resin Composition>

(1) Aliphatic Polyester (AI):
 "GSPla" (AZ91T) which is manufactured by Mitsubishi Chemical Corporation and is a polyester mainly comprising succinic acid/1,4-butanediol was used.
(2) Aliphatic Polyester (AII):
 "Terramac" (TE-7000) manufactured by Unitika Limited was used. Incidentally, as the aliphatic polyester (AII), TE-4000 grade of "Terramac" may be used, as well as "LACEA" (H-100J) manufactured by Mitsui Chemicals, Inc. may be used.

Production Example 1

The rubber-reinforced styrene-based resin (B1) was produced by the following method. Thus, into a glass flask equipped with a stirrer, 75 parts of ion-exchanged water, 0.5 parts of potassium rosinate, 0.1 parts of tert-dodecyl mercaptan, 40 parts (solid content) of polybutadiene latex (average diameter: 350 nm, gel content: 85%), 15 parts of styrene and 5 parts of acrylonitrile were added in nitrogen stream and the flask was heated with stirring. When the inside temperature reached to 45° C., a solution prepared by dissolving 0.2 parts of sodium pyrophosphate, 0.01 parts of ferrous sulfate heptahydrate and 0.2 parts of glucose into 20 parts of ion-exchanged water was added into the mixture. Thereafter, 0.07 parts of cumene hydroperoxide was added to the mixture to initiate the polymerization. After one hour polymerization, 50 parts of ion-exchanged water, 0.7 parts of potassium rosinate, 30 parts of styrene, 10 parts of acrylonitrile, 0.05 parts of tert-dodecyl mercaptan and 0.05 parts of cumene hydroperoxide were further continuously added for 3 hours and further the polymerization was conducted for one hour. Thereafter, 0.2 parts of 2,2'-methylene-bis(4-ethyl-6-tert-butylphenol) was added to complete the polymerization. The latex of reaction product was coagulated with aqueous sulfuric acid, washed with water, washed and neutralized with aqueous potassium hydroxide solution, further washed with water and dried to obtain a rubber-reinforced styrene-based resin (B1). The graft percentage of the resin was 68% and the intrinsic viscosity [η] of acetone-soluble component thereof was 0.45 dl/g.

Production Example 2

The rubber-reinforced styrene-based resin (B2) was produced by the following method. Thus, the same procedure as described in Production Example 1 was conducted except for using 60 parts (solid content) of polybutadiene latex, 30 parts of styrene and 10 parts of acrylonitrile as the monomers to obtain a rubber-reinforced styrene-based resin (B2) by the emulsion polymerization. The obtained latex was coagulated with aqueous sulfuric acid, washed with water, washed and neutralized with aqueous potassium hydroxide solution, further washed with water and dried to obtain a rubber-reinforced styrene-based resin (B2). The graft percentage of the resin was 54% and the intrinsic viscosity [η] of acetone-soluble component thereof was 0.39 dl/g.

Production Example 3

The rubber-reinforced styrene-based resin (B3) was produced by the following method. Thus, the same procedure as described in Production Example 1 was conducted except for using 20 parts (solid content) of polybutadiene latex, 60 parts of styrene and 20 parts of acrylonitrile as the monomers to obtain a rubber-reinforced styrene-based resin (B3) by the emulsion polymerization. The obtained latex was coagulated with aqueous sulfuric acid, washed with water, washed and neutralized with aqueous potassium hydroxide solution, further washed with water and dried to obtain a rubber-reinforced styrene-based resin (B3). The graft percentage of the resin was 107% and the intrinsic viscosity [η] of acetone-soluble component thereof was 0.51 dl/g.

Production Example 4

The rubber-reinforced styrene-based resin (B4) was produced by the following method. Thus, the same procedure as described in Production Example 1 was conducted except for using 40 parts (solid content) of polybutadiene latex, 45 parts of styrene and 15 parts of acrylonitrile as the monomers to obtain a rubber-reinforced styrene-based resin (B4) by the emulsion polymerization. The obtained latex was coagulated with aqueous sulfuric acid, washed with water, washed and neutralized with aqueous potassium hydroxide solution, further washed with water and dried to obtain a rubber-reinforced styrene-based resin (B4). The graft percentage of the resin was 45% and the intrinsic viscosity [η] of acetone-soluble component thereof was 0.35 dl/g.

Production Example 5

The rubber-reinforced styrene-based resin (B5) was produced by the following method. Thus, the same procedure as described in Production Example 1 was conducted except for using 40 parts (solid content) of polybutadiene latex, 42 parts of styrene, 15 parts of acrylonitrile and 3 parts of glycidyl methacrylate as the monomers to obtain a rubber-reinforced styrene-based resin (B5) by the emulsion polymerization. The obtained latex was coagulated with aqueous sulfuric acid, washed with water, washed and neutralized with aqueous potassium hydroxide solution, further washed with water and dried to obtain a rubber-reinforced styrene-based resin (B5). The graft percentage of the resin was 65% and the intrinsic viscosity [η] of acetone-soluble component thereof was 0.43 dl/g.

Production Example 6

The styrene-based resin (B6) was produced by the following method. Thus, two polymerization reactors equipped with a ribbon blade and jackets were connected and the atmosphere therein was substituted with nitrogen. Into the first reactor, 75 parts of styrene, 25 parts of acrylonitrile and 20 parts of toluene were continuously added. Further, a solution prepared by dissolving 0.15 parts of tert-dodecyl mercaptan into 5 parts of toluene as the molecular weight controller and a solution prepared by dissolving 0.1 parts of 1,1'-azobis (cyclohexane-1-carbonitrile) into 5 parts of toluene as the polymerization initiator were continuously fed into the mixture. The polymerization temperature in the first reactor was controlled to 110° C., the average retention time was 2.0 hours and the polymerization conversion was 57%. The obtained polymer solution was continuously discharged by a pump equipped to the outside of first reactor in an equal amount of feed amounts of styrene, acrylonitrile, toluene, molecular weight controller and polymerization initiator and the discharged solution was fed into the second reactor. The polymerization in the second reactor was conducted at 130° C. The polymerization conversion was 75%. To the obtained copolymer solution from the second reactor, unreacted monomer and solvent were directly evaporated by use of a twin-screw three stages vented extruder to obtain a styrene-based resin (B6) having an intrinsic viscosity [η] of 0.60 dl/g.

Production Example 7

The styrene-based resin (B7) was produced by the following method. Thus, two polymerization reactors equipped with a ribbon blade and jackets were connected and the atmosphere therein was substituted with nitrogen. Into the first reactor, 77 parts of styrene, 23 parts of acrylonitrile and 20 parts of toluene were continuously added. Further, a solution prepared by dissolving 0.15 parts of tert-dodecyl mercaptan into 5 parts of toluene as the molecular weight controller and a solution prepared by dissolving 0.1 parts of 1,1'-azobis (cyclohexane-1-carbonitrile) into 5 parts of toluene as the polymerization initiator were continuously fed into the mixture. The polymerization temperature in the first reactor was controlled to 110° C., the average retention time was 2.0 hours and the polymerization conversion was 56%. The obtained polymer solution was continuously discharged by a pump equipped to the outside of first reactor in an equal amount of feed amounts of styrene, acrylonitrile, toluene, molecular weight controller and polymerization initiator and the discharged solution was fed into the second reactor. The polymerization in the second reactor was conducted at 130° C. The polymerization conversion was 74%. To the obtained copolymer solution from the second reactor, unreacted monomer and solvent were directly evaporated by use of a twin-screw three stages vented extruder to obtain a styrene-based resin (B7) having an intrinsic viscosity [η] of 0.54 dl/g.

Production Example 8

The styrene-based resin (B8) was produced by the following method. Thus, two polymerization reactors equipped with a ribbon blade and jackets were connected and the atmosphere therein was substituted with nitrogen. Into the first reactor, 60 parts of styrene, 40 parts of acrylonitrile and 20 parts of toluene were continuously added. Further, a solution prepared by dissolving 0.15 parts of tert-dodecyl mercaptan into 5 parts of toluene as the molecular weight controller and a solution prepared by dissolving 0.1 parts of 1,1'-azobis (cyclohexane-1-carbonitrile) into 5 parts of toluene as the polymerization initiator were continuously fed into the mixture. The polymerization temperature in the first reactor was controlled to 110° C., the average retention time was 2.0 hours and the polymerization conversion was 55%. The obtained polymer solution was continuously discharged by a pump equipped to the outside of first reactor in an equal amount of feed amounts of styrene, acrylonitrile, toluene, molecular weight controller and polymerization initiator and the discharged solution was fed into the second reactor. The polymerization in the second reactor was conducted at 130° C. The polymerization conversion was 75%. To the obtained copolymer solution from the second reactor, unreacted monomer and solvent were directly evaporated by use of a twin-screw three stages vented extruder to obtain a styrene-based resin (B8) having an intrinsic viscosity [η] of 0.50 dl/g.

Production Example 9

The styrene-based resin (B9) was produced by the following method. Thus, the same procedure as described in Production Example 7 was conducted except for using methyl methacrylate instead of acrylonitrile to obtain a styrene-based resin (B9) having an intrinsic viscosity [η] of 0.51 dl/g.

Production Example 10

The epoxy group modified styrene-based resin (B10) was produced by the following method. Thus, the same procedure as described in Production Example 7 was conducted except for using "68 parts of styrene, 22 parts of acrylonitrile and 10 parts of glycidyl methacrylate instead of "75 parts of styrene and 25 parts of acrylonitrile" to obtain a epoxy group modified styrene-based resin (B10) having an intrinsic viscosity [η] of 0.60 dl/g.

Examples 1 to 24 and Comparative Examples 1 to 7

Respective materials were blended by use of a Henschel mixer in respective blending ratios shown in Table 1 to 4, the mixture was melt-kneaded by use of a single screw extruder (cylinder temperature set: 220 to 240° C.) and pelletized. The obtained pellets were sufficiently dried and injection-molded (cylinder temperature set: 190° C.) to prepare various test pieces for respective evaluations. The evaluation results are shown in Tables 1 to 4.

TABLE 1

| | Example | | | | | | | |
|---|---|---|---|---|---|---|---|---|
| | 1 | 2 | 3 | 4 | 5 | 6 | 7 | 8 |
| Blending formulation (parts by wt.) Component (A) | | | | | | | | |
| A(I) | 10 | 5 | 15 | 25 | 5 | 5 | 5 | 5 |
| A(II) | 15 | 25 | 15 | 5 | 45 | 45 | 45 | 45 |
| Component (B) | | | | | | | | |
| B1 | 37.5 | 35 | 35 | 35 | 25 | 25 | 25 | 25 |
| B2 | — | — | — | — | — | — | — | — |
| B3 | — | — | — | — | — | — | — | — |
| B4 | — | — | — | — | — | — | — | — |
| B5 | — | — | — | — | — | — | — | — |
| B6 | — | — | — | — | — | 25 | — | — |
| B7 | 37.5 | 35 | 35 | 35 | 25 | — | — | — |
| B8 | — | — | — | — | — | — | 25 | — |
| B9 | — | — | — | — | — | — | — | 25 |
| B10 | — | — | — | — | — | — | — | — |
| Blending percentage | | | | | | | | |
| (A) | 25 | 30 | 30 | 30 | 50 | 50 | 50 | 50 |
| (B) | 75 | 70 | 70 | 70 | 50 | 50 | 50 | 50 |
| (AI) | 40 | 17 | 50 | 83 | 10 | 10 | 10 | 10 |
| (AII) | 60 | 83 | 50 | 17 | 90 | 90 | 90 | 90 |
| Evaluation | | | | | | | | |
| Impact resistance (J) | 42 | 43 | 42 | 42 | 52 | 52 | 52 | 53 |
| Fracture morphology | ◯ | ◯ | ◯ | ◯ | ◯ | ◯ | ◯ | ◯ |
| Bending modulus (MPa) | 1550 | 2325 | 1450 | 1400 | 2400 | 2690 | 2110 | 2150 |

TABLE 2

| | Example | | | | | | | |
|---|---|---|---|---|---|---|---|---|
| | 9 | 10 | 11 | 12 | 13 | 14 | 15 | 16 |
| Blending formulation (parts by wt.) Component (A) | | | | | | | | |
| A(I) | 5 | 10 | 10 | 10 | 10 | 10 | 10 | 10 |
| A(II) | 45 | 40 | 40 | 40 | 40 | 40 | 40 | 40 |
| Component (B) | | | | | | | | |
| B1 | 25 | 10 | 25 | — | — | — | — | — |
| B2 | — | — | — | 25 | — | — | — | — |
| B3 | — | — | — | — | 25 | — | — | — |
| B4 | — | — | — | — | — | 25 | — | — |
| B5 | — | — | — | — | — | — | 10 | — |
| B6 | — | — | — | — | — | — | — | — |
| B7 | 15 | 40 | 25 | 25 | 25 | 25 | 25 | — |
| B8 | — | — | — | — | — | — | — | 25 |
| B9 | — | — | — | — | — | — | — | — |
| B10 | 10 | — | — | — | — | — | — | — |
| Blending percentage | | | | | | | | |
| (A) | 50 | 50 | 50 | 50 | 50 | 50 | 50 | 50 |
| (B) | 50 | 50 | 50 | 50 | 50 | 50 | 50 | 50 |
| (AI) | 10 | 20 | 20 | 20 | 20 | 20 | 20 | 20 |
| (AII) | 90 | 80 | 80 | 80 | 80 | 80 | 80 | 80 |
| Evaluation | | | | | | | | |

TABLE 2-continued

| | Example | | | | | | | |
|---|---|---|---|---|---|---|---|---|
| | 9 | 10 | 11 | 12 | 13 | 14 | 15 | 16 |
| Impact resistance (J) | 53 | 48 | 51 | 53 | 48 | 45 | 41 | 47 |
| Fracture morphology | ○ | ○ | ○ | ○ | ○ | ○ | ○ | ○ |
| Bending modulus (MPa) | 2320 | 1950 | 2230 | 2220 | 2240 | 1900 | 1950 | 2245 |

TABLE 3

| | Example | | | | | | | |
|---|---|---|---|---|---|---|---|---|
| | 17 | 18 | 19 | 20 | 21 | 22 | 23 | 24 |
| Blending formulation (parts by wt.) Component (A) | | | | | | | | |
| A(I) | 10 | 15 | 25 | 40 | 10 | 15 | 30 | 30 |
| A(II) | 40 | 35 | 25 | 10 | 50 | 45 | 30 | 40 |
| Component (B) | | | | | | | | |
| B1 | 25 | 25 | 25 | 25 | 20 | 20 | 20 | 15 |
| B2 | — | — | — | — | — | — | — | — |
| B3 | — | — | — | — | — | — | — | — |
| B4 | — | — | — | — | — | — | — | — |
| B5 | — | — | — | — | — | — | — | — |
| B6 | 25 | — | — | — | — | — | — | — |
| B7 | — | 25 | 25 | 25 | 20 | 20 | 20 | 15 |
| B8 | — | — | — | — | — | — | — | — |
| B9 | — | — | — | — | — | — | — | — |
| B10 | — | — | — | — | — | — | — | — |
| Blending percentage | | | | | | | | |
| (A) | 50 | 50 | 50 | 50 | 60 | 60 | 60 | 70 |
| (B) | 50 | 50 | 50 | 50 | 40 | 40 | 40 | 30 |
| (AI) | 20 | 30 | 50 | 80 | 17 | 25 | 50 | 43 |
| (AII) | 80 | 70 | 50 | 20 | 83 | 75 | 50 | 57 |
| Evaluation | | | | | | | | |
| Impact resistance (J) | 51 | 48 | 44 | 43 | 43 | 43 | 42 | 44 |
| Fracture morphology | ○ | ○ | ○ | ○ | ○ | ○ | ○ | ○ |
| Bending modulus (MPa) | 2500 | 1850 | 1380 | 1350 | 2300 | 2105 | 1405 | 1455 |

TABLE 4

| | Comp. Example | | | | | | |
|---|---|---|---|---|---|---|---|
| | 1 | 2 | 3 | 4 | 5 | 6 | 7 |
| Blending formulation (parts by wt.) Component (A) | | | | | | | |
| A(I) | 100 | — | — | — | 50 | 5 | 40 |
| A(II) | — | 100 | 50 | 33.3 | — | 5 | 50 |
| Component (B) | | | | | | | |
| B1 | — | — | — | 33.3 | 25 | 45 | 5 |
| B2 | — | — | 25 | — | — | — | — |
| B3 | — | — | — | — | — | — | — |
| B4 | — | — | — | — | — | — | — |
| B5 | — | — | — | — | — | — | — |
| B6 | — | — | 25 | — | 25 | 45 | 5 |
| B7 | — | — | — | 33.3 | — | — | — |
| B8 | — | — | — | — | — | — | — |
| B9 | — | — | — | — | — | — | — |
| B10 | — | — | — | — | — | — | — |
| Blending percentage | | | | | | | |
| (A) | 100 | 100 | 50 | 33 | 50 | 10 | 90 |
| (B) | 0 | 0 | 50 | 67 | 50 | 90 | 10 |
| (AI) | 100 | 0 | 0 | 0 | 100 | 50 | 44 |
| (AII) | 0 | 100 | 100 | 100 | 0 | 50 | 56 |
| Evaluation | | | | | | | |
| Impact resistance (J) | 2 | 5 | 1 | 1 | 40 | 40 | 30 |
| Fracture morphology | X | X | X | X | ○ | ○ | X |
| Bending modulus (MPa) | 600 | 3370 | 2700 | 2500 | 950 | 1200 | 1600 |

From the results shown in Tables 1 to 4, the following conclusion is clearly understood.

In Examples 1 to 24, the resin compositions are excellent in the impact resistance, fracture morphology and rigidity.

In Comparative Example 1, which shows the result in case where the component (AI) is singly used, all the impact resistance, fracture morphology and rigidity are poor.

In Comparative Example 2, which shows the result in case where the component (AII) is singly used, although the rigidity is high, both the impact resistance and fracture morphology are poor.

In Comparative Examples 3 and 4, which show the results in case where no component (AI) is blended and the component (AII) and the styrene-based resin (B) are blended, although the rigidity is high, both the impact resistance and fracture morphology are poor.

In Comparative Example 5, which shows the result in case where no component (AII) is blended and the component (AI) and the styrene-based resin (B) are blended, although the impact resistance is high, the rigidity is poor.

In Comparative Example 6, which shows the result in case where the amount of component (A) used is smaller than the range defined in the present invention and the amount of component (B) used is higher than the range defined in the present invention, although the impact resistance is high, the rigidity is poor. Also, the effect for reducing environmental load is poor.

In Comparative Example 7, which shows the result in case where the amount of component (A) used is higher than the range defined in the present invention and the amount of component (B) used is smaller than the range defined in the present invention, the rigidity and fracture morphology are poor.

The invention claimed is:

1. A thermoplastic resin composition comprising:
   15 to 85% by mass of aliphatic polyester-based resin (A) comprising the following (AI) and (AII) components, wherein the blending ratio by mass of (AI) and (AII) is (AI)/(AII)=2-30/98-70, and
   15 to 85% by mass of styrene-based resin (B) which is at least one selected from the group consisting of the following (BI) and a mixture of (BI) and (BII), where the total amount of components (A) and (B) is 100% by mass,
   said (AI) being an aliphatic polyester-based resin having a number average molecular weight of 10000 to 200000 and having units formed from an aliphatic diol and/or an alicyclic diol and an aliphatic dicarboxylic acid, including derivatives thereof, and/or an alicyclic dicarboxylic, including derivatives thereof, as repeating units, said (AII) being a polylactic acid-based aliphatic polyester resin having not less than 70 mol % of lactic acid unit content, said (BI) being a graft copolymer obtained by polymerizing vinyl-based monomers (b2) comprising an aromatic vinyl compound and another vinyl compound copolymerizable therewith in the presence of rubber polymer (b1), and said (BII) being a polymer of vinyl-based monomers (b2) wherein said composition has an impact strength of not less than 41 (J) and a bending modulus of not less than 1850 (MPa).

2. A thermoplastic resin composition according to claim 1, wherein the styrene-based resin is obtained from using a (meth)acrylate compound as the monomer and the content of (meth)acrylate compound based on the mass of styrene-based resin (B) is 1 to 80% by mass.

3. A thermoplastic resin composition according to claim 1, wherein the styrene-based resin (B) is obtained by using at least one functional group-containing unsaturated compound selected from the group of unsaturated acid, epoxy group containing unsaturated compound, hydroxyl group-containing unsaturated compound, oxazoline group-containing unsaturated compound, acid anhydride group-containing unsaturated compound, amino group-containing substituted or unsubstituted unsaturated compound as the monomer, and the content of functional group-containing unsaturated compound based on the mass of styrene-based resin (B) is 0.1 to 20% by mass.

4. A thermoplastic resin composition according to claim 1, wherein the content of rubber polymer (b1) in the styrene-based resin (BI) is 20 to 80% by mass based on 100% by mass of styrene-based resin (BI).

5. A thermoplastic resin composition according to claim 1, wherein the graft percentage of styrene-based resin (BI) is 20 to 200% and the intrinsic viscosity [η] of an acetone-soluble component contained therein measured in a methylethyl ketone solution at 30° C. is 0.2 to 1.2 dl/g.

6. A thermoplastic resin composition according to claim 1, further comprising 2 to 100 parts by mass of thermoplastic resin (C) based on 100 parts by mass of total amount of aliphatic polyester-based resin (A) and styrene-based resin (B), which thermoplastic resin (C) is at least one selected from the group consisting of aromatic polycarabonate resin, aromatic polyester resin, polyamide resin, acryl-based resin, modified polyolefin-based resin, polyphenylene ether-based resin, polyacetal resin.

7. A thermoplastic resin composition according to claim 1, the glass transition temperature (Tg) of aliphatic polyester-based resin (AI) is not higher than 0° C. and the melting point (Tm) of aliphatic polyester-based resin (AI) is not higher than 130° C.

8. A thermoplastic resin composition according to claim 1, wherein the aliphatic diol constituting the aliphatic polyester-based resin (AI) is 1,4-butanediol.

9. A thermoplastic resin composition according to claim 1, wherein the aliphatic dicarboxylic acid constituting the aliphatic polyester-based resin (AI) is succinic acid and/or adipic acid.

10. A thermoplastic resin composition according to claim 1, wherein the aliphatic polyester-based resin (AI) is a copolymer of aliphatic polyester copolymerized with lactic acid.

11. A resin molded product produced by molding the thermoplastic resin composition as defined in claim 1.

* * * * *